Figure 1:
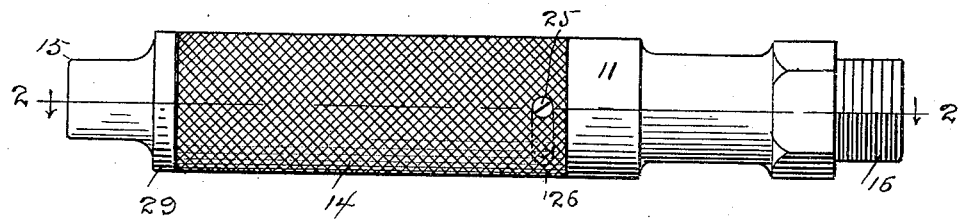

No. 832,038. PATENTED OCT. 2, 1906.
H. A. CARLSSON.
PNEUMATIC VALVE.
APPLICATION FILED APR. 26, 1906.

WITNESSES
H. A. Lamb
S. W. Atherton

INVENTOR
Hampus A. Carlsson
BY
H. M. Wooster
ATTORNEY

UNITED STATES PATENT OFFICE.

HAMPUS A. CARLSSON, OF BRIDGEPORT, CONNECTICUT.

PNEUMATIC VALVE.

No. 832,038.   Specification of Letters Patent.   Patented Oct. 2, 1906.

Application filed April 26, 1906. Serial No. 313,897.

*To all whom it may concern:*

Be it known that I, HAMPUS A. CARLSSON, a subject of the King of Sweden, residing at Bridgeport, county of Fairfield, State of Connecticut, have invented a new and useful Pneumatic Valve, of which the following is a specification.

This invention has for its object to provide a novel pneumatic valve adapted for general use and especially adapted for use upon machine-tools, as upon drilling, reaming, and tapping machines. It has been a serious objection to valves of this character heretofore in use that they wore out very quickly, it being a common experience that the valves while new frequently became set and would not operate at all, thus causing serious inconvenience, and that after being used for a little while they leaked, the leakage constantly increasing until it became necessary to replace the valve with a new one.

My present invention enables me to produce a valve of this character which shall consist of few parts, be simple and inexpensive to make, costing very much less than any valve for the same purpose heretofore produced, and which shall be exceedingly durable, one of my novel valves outwearing several of the more expensive valves now in general use.

With these and other objects in view I have devised the novel pneumatic valve of which the following description, in connection with the accompanying drawings, is a specification, reference characters being used to indicate the several parts.

Figure 2:
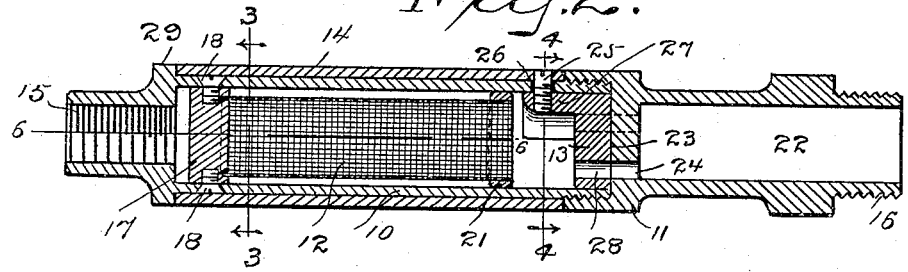
Figure 3:
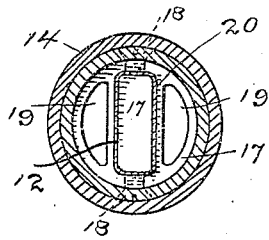
Figure 4:
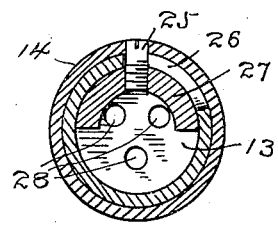
Figure 5:
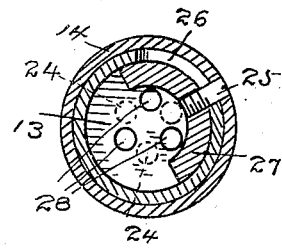
Figure 6:
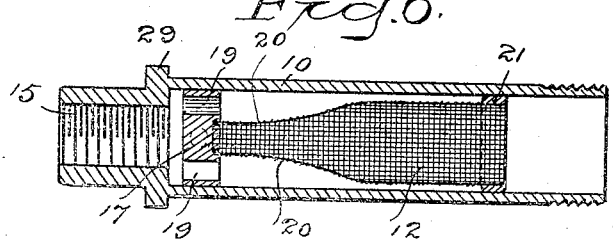
Figure 7:
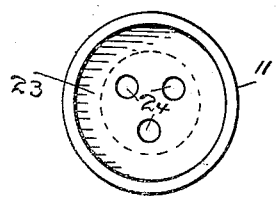

Figure 1 is an elevation of my novel valve complete; Fig. 2, a longitudinal section on the line 2 2 in Fig. 1 looking down; Fig. 3, a transverse section on the line 3 3 in Fig. 2 looking toward the left; Fig. 4, a transverse section on the line 4 4 in Fig. 2 looking toward the right, the valve being in the open position; Fig. 5, a similar view showing the valve in the closed position; Fig. 6, a longitudinal section of the body and air-strainer detached, the body having been given a quarter-turn from the position shown in Fig. 2; and Fig. 7 is a rear end view of the head detached.

10 denotes the body; 11, the head, which is secured to the body by corresponding screw-threads on said parts; 12, the air-strainer, which is secured within the body; 13, the valve proper, and 14 the operating-sleeve, which oscillates on the body and lies between a flange 29 near the outer end of the body and the inner end of the head.

The outer end of the body is provided with an internally-threaded opening 15 for the attachment of the coupling or connection of a flexible tube, (not shown,) and the head is provided with a threaded hub 16, having an opening 22 through it, by means of which the valve is attached in place on a machine. The air-strainer consists of a cylinder of fine wire-gauze flattened at its inner end on opposite sides, as at 20, and rigidly secured to a disk 17, which is itself secured to the body by screws 18.

19 denotes air-openings through the disk outside the flattened sides of the strainer, so that air entering through opening 15 will pass through said openings and then through and into the strainer from the outer side. The opposite end of the strainer is shown as provided with a strengthening-ring 21, which lies within the body, but is not secured thereto. Near the inner end of the head is a wall, the inner face of which is ground to form a valve-seat 23 and which is provided with openings 24 through it for the passage of air. The valve 13 is secured to the operating-sleeve by means of a screw 25, which passes through a slot 26 in the body and engages a flange 27, which extends rearwardly from the valve. The valve is provided with openings 28, which are adapted to register with the corresponding openings 24 in the valve-seat, (see Fig. 4, in which the valve is shown in the open position, and Fig. 5, in which it is shown in the closed position,) the holes in the valve being out of alinement with the holes in the valve-seat.

In practice the valve is preferably made of steel and tempered, and the face thereof is ground to correspond with the ground face of the valve-seat, so as to make a perfectly tight joint between the valve and its seat.

The operation will be readily understood from the drawings. Air enters the body through opening 15, passes through openings 19 in disk 17, and then through the strainer from the outer side inward, and thence through the corresponding openings in the valve and valve-seat when the valve is in the open position, as in Fig. 4. To open or close the valve, it is simply required to oscillate the sleeve sufficiently to move the valve from the position shown in Fig. 4 to the position shown in Fig. 5, or vice versa, the oscillation of the sleeve and valve being limited by the engagement of screw 25 with the ends of slot 26 in the body. Owing to the fact that all air passing through the valve must pass through the strainer, it is made practically impossible for particles of dust to get between the face of the valve and the face of the wall which forms the valve-seat, so that there is no chance for wear of the parts and nothing to prevent the valve as a whole from lasting an almost unlimited length of time.

Having thus described my invention, I claim—

1. A valve of the character described comprising a body, an air-strainer secured thereto, a valve-seat having a ground face with openings through it, a valve having a correspondingly-ground face and corresponding openings, and an operating-sleeve to which the valve is connected and by which the openings in the valve may be placed in or out of alinement with the openings in the seat.

2. A valve of the character described comprising a body, a cylindrical air gauze-wire strainer having its opposite sides flattened at the inner end, a disk secured within the body to which the flattened end of the strainer is secured and which is provided with air-openings outside the flattened sides of the strainer so that air will pass through the strainer from the outer side inward, a valve-seat having a ground face with openings through it, a valve having a correspondingly-ground face and corresponding openings lying between the strainer and the valve-seat and an operating-sleeve to which the valve is connected.

3. An air-strainer comprising a wire-gauze cylinder having its sides flattened at one end and a disk to which the flattened end of the cylinder is attached and which is provided with air-openings outside the flattened sides of the cylinder, substantially as described, for the purpose specified.

4. An air-strainer comprising a wire-gauze cylinder having at one end a strengthening-ring and having its sides flattened at the other end, and a disk to which the flattened end of the cylinder is attached and which is provided with air-openings outside the flattened sides of the cylinder, substantially as described, for the purpose specified.

5. A valve of the character described comprising a body having a slot 26, an air-strainer secured within the body, a valve-seat having a ground face with openings through it, a valve having a correspondingly-ground face, corresponding openings, and a rearwardly-extending flange, an operating-sleeve inclosing the body and a screw passing through the slot in the body and engaging the sleeve and the flange of the valve.

6. A valve of the character described comprising a body, an air-strainer secured thereto, a head threaded to engage one end of the body and having a valve-seat with a ground face and openings through it, a valve having a correspondingly-ground face and corresponding openings, and an operating-sleeve inclosing the body to which the valve is rigidly connected.

In testimony whereof I affix my signature in presence of two witnesses.

HAMPUS A. CARLSSON.

Witnesses:
A. M. WOOSTER,
S. W. ATHERTON.